United States Patent Office 2,861,962
Patented Nov. 25, 1958

2,861,962

PROCESS FOR THE POLYMERIZATION OF OLEFIN OXIDES WITH FERRIC COMPOUNDS

Alexej Bohumil Borkovec, Lake Jackson, Tex., assignor to The Dow Chemical Company, Midland, Mich., a corporation of Delaware No Drawing. Application June 5, 1957
Serial No. 663,612

7 Claims. (Cl. 260—2)

The present invention has reference to, and has as among its principal objectives, the provision of a novel and greatly improved process for the polymerization of olefin oxides, particularly propylene oxide, to solid polymeric materials under the catalytic influence of certain partially hydrolyzed ferric compounds that are adapted to secure unusually complete conversions of monomer to polymer and exceptionally good yields of desirable solid polymer products.

According to the invention, various olefin oxides, particularly propylene oxide, may be polymerized, with practically complete or almost complete conversion of monomer, to provide relatively high yields of solid polymeric materials by employing, as a catalyst for the polymerization, a partially hydrolyzed ferric compound having the general empirical formula:

$$Fe(OH)_x(OZ)_{3-x}$$

wherein Z is selected from the group consisting of alkyl radicals, haloalkyl radicals and aromatic hydrocarbon radicals and $x$ is a positive number having a value greater than zero but less than three. Advantageously, Z may be an alkyl radical that contains up to 6 carbon atoms to provide such catalytic compounds as partially hydrolyzed ferric methylate, partially hydrolyzed ferric ethylate, partially hydrolyzed ferric n-propylate, partially hydrolyzed ferric isopropylate, partially hydrolyzed ferric n-butylate and the like. It may also be advantageous for Z to be a haloalkyl radical that likewise contains up to 6 carbon atoms to provide such catalytic compounds as partially hydrolyzed ferric chloromethylate, partially hydrolyzed ferric chloroethylate, partially hydrolyzed ferric chloro-n-propylate, partially hydrolyzed ferric chloroisopropylate, partially hydrolyzed ferric chloro-n-butylate and the like. The corresponding fluoro-, bromo- and iodo-analogs may also be utilized with benefit in place of the chloro-derivatives, if so desired. Better results are generally obtainable with the partially hydrolyzed ferric alkylate and haloalkylate catalysts when they are derived from alkyl and haloalkyl radicals that contain from 2 to 6 carbon atoms. In some instances, however, it may be beneficial for Z to be an aromatic radical that contains from 6 to 10 carbon atoms such as those that are present in partially hydrolyzed ferric phenolate, partially hydrolyzed ferric m-cresolate, partially hydrolyzed ferric xylenolate, partially hydrolyzed ferric p-tert.-butyl-phenolate and the like.

The catalytic activity of the partially hydrolyzed ferric compounds of the indicated varieties is amazingly good. It ordinarily may be found to vary with the degree of hydrolysis that is obtained in the partially hydrolyzed catalyst. Thus, the yield of solid polymer that may be obtained in the polymerization with the partially hydrolyzed catalyst is usually found to increase rapidly with the degree of hydrolysis that is present in the catalyst up to the level where the content of unhydrolyzed (OZ) groups is only about 25 percent and the empirical formula of the partially hydrolyzed compound corresponds approximately to $Fe(OZ)(OH)_2$. After this, when greater levels of hydrolysis are involved, the yield of solid polymer that may be obtained is found to slowly decrease in proportion to an increasing degree of hydrolysis. The conversion of monomer to polymer in the polymerization is also proportional to the degree of hydrolysis of the catalyst; decreasing quite slowly until about a 25 percent level of hydrolysis is obtained. After this point is reached, the decrease in conversion rate is more rapid in proportion to the level of hydrolysis in the catalyst. Taking all factors into account, however, it is usually advantageous for the degree of hydrolysis that is obtained in the compounds to be from about 40 to 90 percent of completion. Thus it is beneficial and desirable for the numerical value of $x$ to be from about 1.2 to 2.7.

The polymeric materials that may be obtained by practice of the process of the present invention are solid substances that have at least one and usually more of a variety of uses including the preparation of moldings, films, fibers and filamentous articles and in coating compositions for various protective surface covering applications. They generally provide tenacious and high strength fabricated articles that have inherently good dielectric properties. Propylene oxide, for example, may generally be completely or substantially completely converted by the present method to a white, solid, crystalline polymeric material that may have an average molecular weight in excess of 100,000, a melting point that may be greater than 50° C., and frequently greater than 70° C., and a specific gravity in the neighborhood of 1.03–1.05. The homopolymers of propylene oxide which may be obtained are essentially similar to those which have been described in United States Letters Patent Number 2,706,189.

The partially hydrolyzed ferric alkylate and ferric arylate catalytic compounds that are employed with such great advantage in the practice of the present invention may be derived easily from the corresponding ferric alkylates and arylates by incomplete hydrolysis of the particular parent compound that is involved. This may be accomplished at moderate temperatures of from, say 10 to 80° C., by adding an adequate quantity of water to obtain the desired degree of partial hydrolysis of the parent ferric alkylate or arylate while it is dissolved in a suitable anhydrous solvent, such as absolute alcohol and the like. The preparation of the partially hydrolyzed catalyst should be at temperatures that are less than about 80° C. since the catalyst decomposes when it is subjected to heat at more elevated temperatures. The reaction may be carried out at atmospheric pressure and within the period of time that is required for complete addition of the water in dropwise increments and preferably in solution with another solvent. The catalytic, partially hydrolyzed ferric alkylate and ferric arylate compounds are usually isolated as solids for subsequent employment in the polymerization. They are usually non-crystalline in nature and have a yellow to brown shade of coloration. They have high surface area characteristics (as from 10 to 400 square meters) per gram) and are insoluble in the common organic solvents. The partially hydrolyzed catalysts react with water to form complex ferric hydroxides and are thermally decomposable above the indicated temperature levels.

The structures of the partially hydrolyzed ferric alkylates and arylates do not correspond to the simple empirical formula 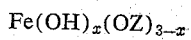$Fe(OH)_x(OZ)_{3-x}$. On the basis of reasonable information and belief based upon such evidence as their total lack of crystallinity (confirmed by X-ray analysis) and their insolubility in all polar or non-polar organic solvents, they are thought to be polymeric and highly cross-linked materials. Although the nature of the bonds that are responsible for their polymerization is conjectural, there exists grounds for presuming that iron nucleus is capable of forming a coordinate covalent bond with any neighboring oxygen atom. Thus, a hydroxyl group attached to an iron atom could serve as a bridge between two molecules of the partially hydrolyzed catalyst. Such hypothesis finds support in the fact that the infrared spectra of the partially hydrolyzed ferric alkylates, for example, do not exhibit any prominent band in the 2.75–3.25μ region as might be expected if free hydroxyl groups were present in the material. Probably a structural formula such as:

$$[Fe(OH)_x(OZ)_{3-x}]_n$$

wherein $n$ is a plural integer, would provide a more accurate representation of the nature of the partially hydrolyzed catalysts.

In this connection, ferric methylate seems to present a special case among the ferric alkylates since, even in its unhydrolyzed state, it appears to have a polymeric nature. This is exemplified by its amorphousness and insolubility in an unhydrolyzed condition. The methyl group does not seem to interfere with the bridge-forming propensities of the oxygen atoms. As a matter of fact, the hydrolysis of ferric methylate in the presence of moisture may be observed to proceed only at a very slow rate.

The ferric alkylate and ferric arylate compounds from which the partially hydrolyzed catalytic derivatives are obtained may be prepared readily by the metathetical reaction which occurs between ferric chloride or ferric bromide and a suitable metal alkylate or arylate such as sodium, potassium or magnesium alkylates or arylates. The reaction may be accomplished readily in the parent alcohol. Alternatively, the parent ferric alkylate and arylate compounds may be obtained from the metathesis between ferric chloride or bromide and a suitable alkoxy- or aryloxymagnesium or equivalent chloride or bromide as typified by the following, wherein Z is the desired alkyl or aryl group and X is chlorine or bromine:

$$FeCl_3 + 3ZOMgX \rightarrow 3MgXCl + Fe(OZ)_3$$

Parent ferric haloalkylate compounds for preparation of the partially hydrolyzed derivatives may be obtained advantageously by the reaction between a ferric alkylate and a haloalcohol in the following manner:

$$3XZOH + Fe(OR)_3 \rightarrow 3ROH + Fe(OZX)_3$$

wherein XZ is the desired haloalkyl unit in which X is a substituent halogen atom and R is another alkyl group. Ferric ethylate may be utilized with great benefit in such a reaction with haloalcohols that have a boiling point in excess of about 78° C. The ferric haloalkylate compound that is prepared may be isolated simply, if desired, by distillation of the alcohol that is formed in the reaction. Ferric haloalkylates may also be formed by reacting ferric chloride or bromide with a suitable haloalkyl magnesium halide, which may be obtained from the reaction between a haloalcohol and and an alkyl magnesium halide, according to the following:

$$XZOH + RMgX \rightarrow RH + XZOMgX$$
$$3XZOMgX + FeCl_3 \rightarrow 3MgXCl + Fe(OZX)_3$$

in certain instances, as when the alkali metal does not react with the halogen of the haloalcohol, the desired ferric haloalkylate may be prepared from an alkali metal haloalkylate which may sometimes be formed by direct reaction between an elemental alkali metal, such as metallic sodium, and a haloalcohol. This is illustrated by the following:

$$2XZOH + 2Na \rightarrow 2XZONa + H_2$$
$$3XZONa + FeCl_3 \rightarrow 3NaCl + Fe(OZX)_3$$

The amount of the partially hydrolyzed catalyst that is employed may ordinarily, with advantage, be an amount that is between about 1 and 6 percent by weight, based on the weight of the oxide monomer being polymerized. Preferably, an amount of the catalyst in the neighborhood of 2–4 percent by weight is utilized. The employment of the latter amount of catalyst for accomplishing the polymerization ordinarily secures optimum rates of reaction and more complete conversions of the monomer to polymer. In this connection, it is oftentimes possible in the practice of the present invention to secure complete conversion of monomer to polymer with yields of solid, more useful polymeric material that frequently are as high as 60 to 80 and more percent of the converted monomeric substances. The exact yields of solid polymer that may be obtained in particular instances may vary somewhat from time to time according to the method of recovery and polymer purification that is followed. At any rate, the use of the partially hydrolyzed ferric compounds as catalysts in the process of the present invention generally secures better results and more desirable product yields than may be obtained with employment of the catalyst materials heretofore known in the art for the same polymerization purposes.

The polymerization may usually be conducted within a time period of from 3 to 200 hours at a temperature between about 40° C. and about 150° C. Advantageously, the polymerization may be effected at a temperature in the range from about 70° to 100° C. in order to avoid the prolonged periods of time that may be required to reach a suitable point for termination of the reaction when lower temperatures are employed and to insure the achievement of relatively greater conversions that sometimes may be difficult to realize at higher operating temperatures. Within the narrower range, suitable results may frequently be obtained when the polymerization has been conducted for a period of time betwen about 40 and 180 hours. The greatest advantage is usually derived with respect to both the conversion efficiency and product quality when the temperature for the polymerization is maintained in the neighborhood of 90° C.

It ordinarily may be convenient and frequently may be found more expedient for the polymerization to be accomplished by charging the reactant ingredients, including the catalyst, to a closed vessel wherein they may be heated until the polymerization has been completed or terminated. It is usually beneficial for the reaction mass to be agitated during the polymerization. Care should be taken to avoid the presence of water or alcohol in the polymerization mass since they frequently may exert a deleterious influence on the rate of the reaction and the monomer conversion that may be obtained.

The polymerization reaction will also proceed when the monomeric oxide and the partially hydrolyzed catalyst are dispersed in a suitable inert non-aqueous diluent medium. The employment of such a medium for the polymerization will usually tend to reduce the rate of the reaction. Even when the medium dissolves the monomeric oxide, it is generally found to be a non-solvent suspending medium or diluent for the catalyst compound. Polar solvents, such as ethers, ketones, ketals and the like, seem to reduce the yields of solid polymer that may be obtained. Nonpolar solvents, such as petroleum ether, hexane, hydrocarbon solvents and the like, do not seem to appreciably affect the yield. In most cases if it is desired to employ a diluent medium, it is most advantageous to utilize a large excess quantity of the monomer for the purpose.

The polymerized product may be recovered and purified from the reaction mass according to several procedures. For example, excess monomer and the solvent or other diluent medium (when one has been employed) may be stripped from the reaction mass by vaporization to leave the catalyst-containing polymeric material which usually is in the form of a tough, rubber-like mass having a brownish coloration and which may be associated with liquid polymers that may have been formed during the reaction. Usually the impure solid polymer may be dissolved in a suitable solvent, such as hot acetone, which may then be acidified with a hydrohalic or other suitable acid to convert the iron-containing, partially hydrolyzed catalyst to a soluble salt form before precipitating the solid polymer by crystallization from the solution at a suitably low temperature that generally is beneath about −20° C. Recrystallization may be employed for further purification until a suitable solid polymeric material is obtained that has a sufficiently high molecular weight to not soften excepting at temperatures that are in excess of about 50° C.

As indicated, the method of the invention is adapted to prepare polymers of other olefin oxides besides propylene oxide. Solid polymers of such lower olefin oxides as ethylene epichlorohydrin, isobutylene oxide and others known as epichlorohydrin, isobutylene oxide and others that contain not more than four carbon atoms in their molecules may also be obtained. In addition, copolymers of propylene oxide and other lower olefin oxides with other organic epoxides that may be used in amounts comprising up to about equal proportions by weight of the latter with the propylene oxide may also be prepared by practice of the invention. Thus, copolymers of propylene oxide with another olefin oxide selected from the group consisting of ethylene oxide, chloropropylene oxide, isobutylene oxide, 1,2-epoxybutane, the isomeric 2,3-epoxybutanes, styrene oxide and mixtures thereof may readily be obtained.

The invention is further illustrated in and by the following examples.

Example 1

Ferric ethylate was prepared, in a system that excluded air and moisture, by incorporating a solution of about 16.2 grams (0.1 mole) of anhydrous ferric chloride in about 100 milliliters of absolute ethyl alcohol, by dropwise addition, into a solution of about 6.9 grams (0.3 mole) of sodium ethylate in 150 milliliters of absolute ethanol. The addition was made at room temperature. After filtering the mixture, the ethanol was removed under vacuum to provide a brown oleaginous material. The resulting material was taken up in a 500 milliliter portion of petroleum ether that boiled between 30 and 40° C. The solution was then filtered and the solvent removed from the filtrate under vacuum. The glassy, brown, solid ferric ethylate product which was obtained was found to contain less than 0.1 percent by weight of chloride and to contain iron, expressed as Fe, in the amount of about 28.9 percent by weight.

About 55 grams (0.29 mole) of the product ferric ethylate was then dissolved in about 500 milliliters of absolute ethanol. The resulting solution was stirred vigorously at 50° C. while a mixture of 100 milliliters of absolute ethyl alcohol and 10.5 grams (0.58 mole) of water was added dropwise thereto over about a 60 minute period. An orange, precipitate formed which was filtered from the reaction mass and dried under a vacuum. It formed about 35 grams of an extremely fine powder that, upon analysis, was found to contain about 10.53 percent (by weight) of carbon; 3.46 percent hydrogen; 49.93 percent iron and 20.0 percent of ethylate (—OC$_2$H$_5$) radical. Its probable composition, upon the basis of reasonable information and belief, was presumed to comprise about 59 percent of Fe(OH)$_2$(OC$_2$H$_5$) and 41 percent of [FeO(OH)]$_n$.

A charge of liquid propylene oxide containing about 2 percent by weight of the partially hydrolyzed ferric ethylate catalyst was heated with agitation in a pressure vessel for about 64 hours while being maintained at a temperature of about 90° C. The entire quantity (100 percent) of the monomeric oxide was completely converted to a polymeric material which was dissolved in dioxane. A small amount of concentrated hydrochloric acid was added to the polymer solution. After the brown color of the solution had changed to yellow (indicating complete conversion of iron to FeCl$_3$), an excess quantity of water was added. This caused the polymer to precipitate, after which it was collected and found to have been obtained in a 93 percent yield. The polymer product was twice reprecipitated from acetone with water. As finally obtained, the polymer product was a white solid that melted at about 50° C. Its molecular weight was greater than 100,000 and it had a specific gravity of about 1.03. Films could be easily fabricated by molding or extruding the polymer product.

Example 2

A dispersion in about 25 grams of propylene oxide of about 1 gram of the same partially hydrolyzed ferric ethylate catalyst as was obtained in the first example was sealed in a stainless steel bomb having a volumetric capacity of about 75 milliliters. The charged, sealed bomb was then heated for about 30 hours in a hot water bath at a temperature of about 90° C. The resulting rubbery polymeric product, after removal of the unreacted monomer, weighed about 24 grams.

A 10 gram portion of the crude polymeric product was dissolved in about 500 milliliters of acetone and the volume of the solution then reduced by evaporation to about 200 milliliters. About 3 milliliters of concentrated hydrochloric acid was then added to the solution to transform the iron therein to FeCl$_3$. The resulting yellow-colored mixture was then kept at about −20° C. for about a 20 hour period. During this time a white precipitate formed which was subsequently collected by filtration and then dried. Between about 6 and 7 grams (60–70 percent yield) of polymer product was thereby obtained.

Another 10 gram sample of the crude polymeric product was dissolved in acetone and acidified in the same manner as above excepting that, after acidification, about 2 liters of water were added to the solution. A white precipitate formed immediately upon addition of the water which was collected and dried. Between about 8 and 9 grams (80–90 percent yield) of polymer product was obtained by this alternative recovery procedure.

Similar excellent results may be obtained when propylene oxide is polymerized under the catalytic influence of partially hydrolyzed ferric n-propylate, partially hydrolyzed ferric isopopylate and partially hydrolyzed ferric n-butylate. Partially hydrolyzed ferric methylate, while operative, is a less active form of the catalyst. In a manner analogous to the foregoing, solid polymers of the other indicated varieties of olefin oxides, including various copolymeric products such as copolymers of about equal weight proportions of propylene and chloropropylene oxides may be prepared in excellent yields with other partially hydrolyzed catalytic ferric compounds adapted for utilization in the present process.

The present invention is to be interpreted and construed in the claims rather than strictly from the foregoing illustrative description and specification.

What is claimed is:

1. Process for polymerizing a lower vicinal olefin oxide that does not contain more than 4 carbon atoms in its molecule to form a solid polymeric material which comprises mixing the oxide with a minor proportion of a catalyst compound having the general empirical formula: Fe(OH)$_x$(OZ)$_{3-x}$, wherein Z is selected from from the group consisting of alkyl radicals containing up to 6 carbon atoms, haloalkyl radicals containing up to 6 carbon atoms, and aromatic hydrocarbon radicals containing from 6 to 10 carbon atoms and wherein $x$ is a positive number having a value greater than zero but less than three, and heating the mixture to maintain it at a temperature between about 40° C. and 150° C. for a sufficient period of time to polymerize the oxide.

2. Process for polymerizing propylene oxide to form a solid polymeric material which comprises mixing the oxide with between about 1 and 6 percent by weight, based on the weight of the oxide, of a catalyst compound having the general formula: $Fe(OH)_x(OZ)_{3-x}$, wherein Z is selected from the group consisting of alkyl radicals containing from 1 to 4 carbon atoms, haloalkyl radicals containing from 1 to 4 carbon atoms, and aromatic hydrocarbon radicals containing from 6 to 10 carbon atoms and wherein $x$ is a positive number having a value greater than zero but less than three, and heating the mixture to maintain it at a temperature between about 70° C. and 100° C. for a sufficient period of time to polymerize substantially all of the oxide to a polymeric material, and subsequently recovering solid propylene oxide from the reaction mass.

3. The process of claim 2, wherein the value of $x$ is from about 1.2 to 2.7.

4. The process of claim 2, wherein the catalyst compound is partially hydrolyzed ferric ethylate.

5. In the process of claim 2, mixing the propylene oxide with an amount of about 4 percent by weight of the catalyst compound, based on the weight of the oxide, and heating the mixture at a temperature of about 80–90° C. to polymerize the oxide.

6. A process in accordance with the process set forth in claim 2, wherein the mixture is heated for a period of time between about 40 and 180 hours.

7. Process for polymerizing propylene oxide with an amount up to about an equal proportion by weight of another olefin oxide selected from the group consisting of ethylene oxide, chloropropylene oxide, isobutylene oxide, 1,2-epoxybutane, the isomeric 2,3-epoxybutanes, styrene oxide and mixtures thereof to form a solid copolymeric material, which process comprises mixing the monomeric oxides with between about 1 and 6 percent by weight, based on the weight of the oxides, of a catalyst compound having the general empirical formula: $Fe(OH)_x(OZ)_{3-x}$, wherein Z is selected from the group consisting of alkyl radicals containing up to 6 carbon atoms, haloalkyl radicals containing up to 6 carbon atoms and aromatic hydrocarbon radicals containing from 6 to 10 carbon atoms, and wherein $x$ is a positive number having a value greater than zero but less than three, and heating the mixture to maintain it at a temperature between about 70° C. and 100° C. for a sufficient period of time to polymerize substantially all of the oxides and subsequently recovering a solid propylene oxide copolymer from the reaction mass.

No references cited.